United States Patent [19]

Takizawa et al.

[11] 4,385,329

[45] May 24, 1983

[54] TAPE DRIVE CONTROL SYSTEM FOR PINCH ROLLER-LESS TYPE TAPE RECORDER

[75] Inventors: Yoshiyuki Takizawa; Takashi Kashiwazaki; Norihiko Itoh; Tomomitsu Takano; Junji Kobayashi, all of Tokorozawa, Japan

[73] Assignee: Pioneer Electronic Corporation, Tokyo, Japan

[21] Appl. No.: 212,163

[22] Filed: Dec. 2, 1980

[51] Int. Cl.³ .................. G11B 19/26; G11B 15/44; G11B 15/26

[52] U.S. Cl. ........................... 360/71; 242/189; 360/72.3

[58] Field of Search .............. 360/71, 72.3, 73, 90, 360/74.1–74.4; 242/186–189, 190–191, 206, 209

[56] References Cited

U.S. PATENT DOCUMENTS

| | | | |
|---|---|---|---|
| 3,769,470 | 10/1973 | Curtis | 360/71 |
| 3,941,332 | 3/1976 | Matula | 242/189 |
| 4,156,257 | 5/1979 | Roberts | 360/71 |
| 4,172,231 | 10/1979 | d'Alayer de Costemore d'Arc | 242/191 |
| 4,213,160 | 7/1980 | Shum et al. | 360/71 |

Primary Examiner—Alfred H. Eddleman
Attorney, Agent, or Firm—Sughrue, Mion, Zinn, Macpeak and Seas

[57] ABSTRACT

A tape drive control system for a pinch roller-less type tape recorder in which tape drive is implemented by frictional force between the capstan and tape. A mode instruction circuit determines the operational mode of a capstan motor drive circuit which operates a capstan motor which in turn rotates the conveying capstan. Tape run detection means detects the actual tape condition. The mode instruction circuit operates both in response to outputs of the tape run detection means and to switch inputs to control the operational mode of the capstan drive.

8 Claims, 5 Drawing Figures 4,385,329

TAPE DRIVE CONTROL SYSTEM FOR PINCH ROLLER-LESS TYPE TAPE RECORDER

BACKGROUND OF THE INVENTION

The present invention relates generally to pinch roller-less type reel-to-reel type recorders in which tape drive is implemented by a frictional force generated by the contact of the tape and a capstan. More particularly, the invention relates to a tape drive control system for use with such tape recorders.

Reel-to-reel recorders have been the subject of continued research into improving the mechanical-electrical interface to achieve greater reliability and improved performance. One of the crucial aspects of performance is the requirement that the tape be driven past the heads at an extremely uniform speed and under a fixed predetermined tension to ensure that the head-tape interface is properly maintained. Many systems for achieving these are known, a popular type using pinch rollers to provide contact pressure with a drive capstan. Such systems, while generally effective, tend to stretch the tape and require contact pressure on the sensitive magnetic surface. The use of pinch rollers therefore presents some undesirable problems. In order to overcome these problem, a pinch roller-less type or frictional force drive capstan type has been the subject of study and potential commercial use.

A typical prior art device is shown in FIG. 1 in which a tape 3 fed from a supply reel 9 is wound on a take-up reel 8 through a roller 7, an idler 2, a capstan 1 and a roller 6. The rollers 6 and 7 are rotatably mounted on first ends of arms 4 and 5, respectively. The first ends of the arms 4 and 5 are inwardly biased by springs 11 and 12, respectively, so that the tape 3 passes over the larger part of the peripheries of the idler 2 and the capstan 1. Because the tape 3 is wound around the idler 2 and the capstan 1 in this manner, the frictional force between the tape 3 and capstan 1 and the idler 2 are stabilized and increased. In a pinch roller-less type tape recorder, unlike an ordinary tape recorder, no pinch roller is needed.

One of the requirements of such system is the prevention of slippage between the capstan and the tape because, in this type of system, the frictional force generated by the contact of the capstan and the tape is used as a driving force for the tape. Another requirement is that the tape run be carried out without scratching or damaging the tape surface particularly when the tape is brought into contact with the capstan.

SUMMARY OF THE INVENTION

An object of the invention is to provide a tape drive control system for use with a pinch roller-less type tape recorder in which tape run and tape stop operation are precisely implemented by controlling the driving of the capstan motor.

In accordance with the invention, there are provided a capstan motor drive circuit for driving the capstan motor, a mode instruction circuit for settting the operational mode (rotational speed and the direction of rotation) of the capstan motor drive circuit, and a tape run detection circuit for detecting the direction of the tape run and the stopped state of the tape. The output of the tape run detection circuit is fed back to the mode instruction circuit. When the operational mode is changed, for example, from a fast-forward mode to a stop mode, the mode instruction circuit instructs the capstan motor drive circuit so as to drive the capstan motor in the reverse direction for a duration such that the output of the direction of the tape run detection circuit corresponds to forward.

The invention will be described in greater detail with reference to the drawings and the description of the preferred embodiments that follows.

DESCRIPTION OF THE PREFERRED EMBODIMENTS

Figure 2:
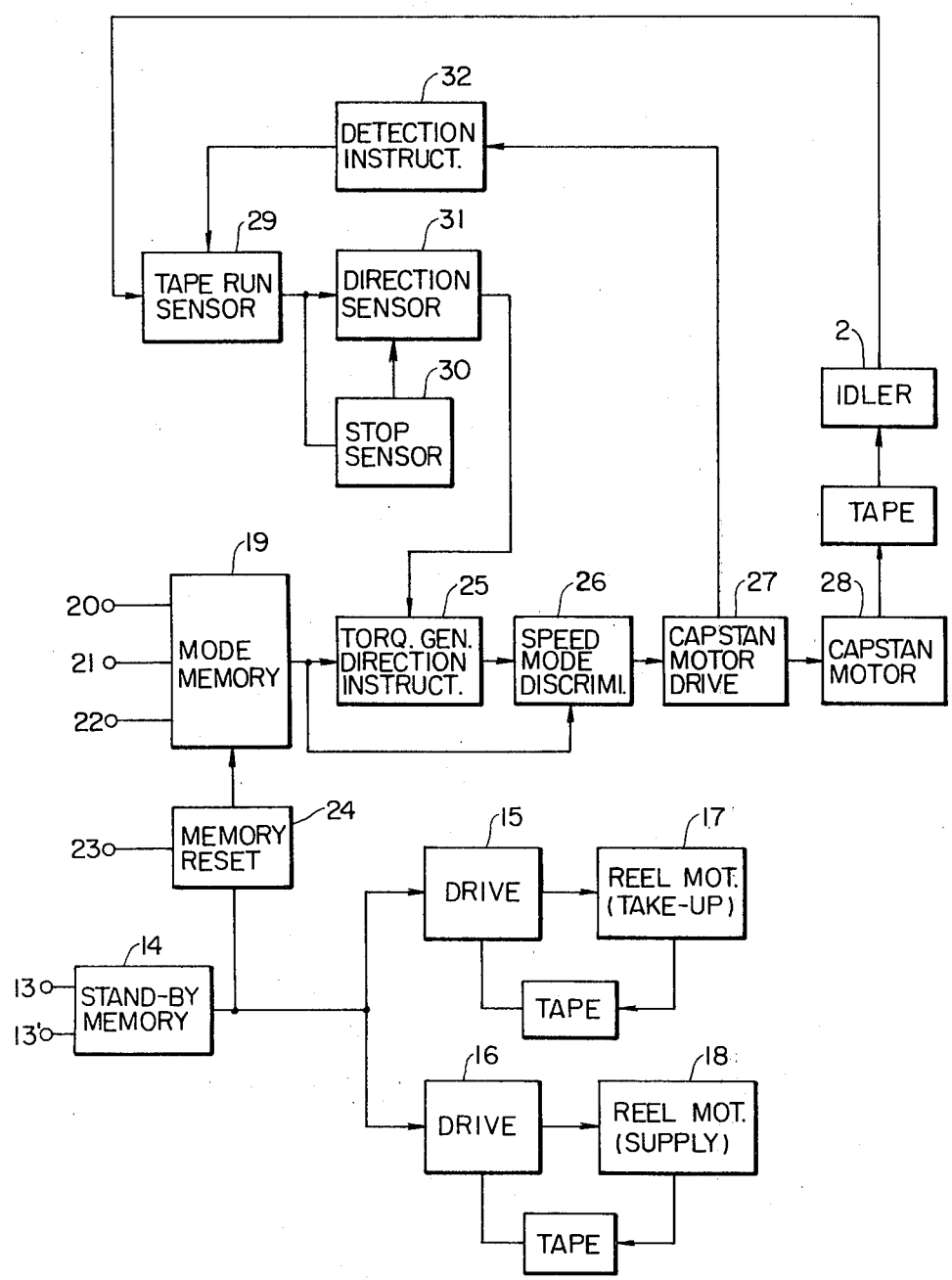
FIG. 2 is a block diagram showing a tape drive control system according to the invention.

Referring to FIG. 2, a block diagram of a tape drive control system for use with a pinch roller-less type tape recorder according to the invention will be described.

Reference numeral 14 designates a stand-by memory circuit having a stand-by terminal 13 and a tape loading terminal 13'. The stand-by memory circuit 14 is connected to driving circuits 15 and 16 which drive take-up and supply reel motors 17 and 18, respectively. The stand-by memory circuit 14 is also connected to a memory reset circuit 24 which is in turn connected to a mode memory circuit 19. The mode memory circuit 19 has a playback/record terminal 20, a fast-forward terminal 21, and rewind terminal 22, and is connected to a torque generation direction instructing circuit 25 which produces an instruction signal which determines the direction of the torque which is applied to a capstan motor 28. The mode memory circuit 19 is also connected to a speed mode discrimination circuit 26 which discriminates the speed mode (constant speed mode or fast speed mode). A direction sensor circuit 31 for sensing the direction of the tape run is connected to the torque generation direction instructing circuit 25. The torque generation direction instructing circuit 25 is connected to the speed mode discrimination circuit 26 which is in turn connected to a capstan motor drive circuit 27 for driving the capstan motor 28. When the capstan motor 28 is operated, the tape is run due to the frictional force between the capstan 1 and the tape. The idler 2 is rotated accordingly.

The capstan motor drive circuit 27 is connected to a detection instructing circuit 32 which instructs a tape run sensor circuit 29 to detect the condition of the tape run. The idler 2 is associated wth the tape run sensor circuit 29 so that the tape run condition is sensed upon receipt of a detection instructing signal from the circuit 32. The tape run sensor circuit 29 is connected to both the direction sensor circuit 31 and a stop sensor circuit 30. The stop sensor circuit 30, which operates to sense the stop condition of the tape, is further connected to the direction sensor circuit 31. As mentioned above, the direction sensor circuit 31 is connected to the torque generation direction instructing circuit 25.

Figure 3:
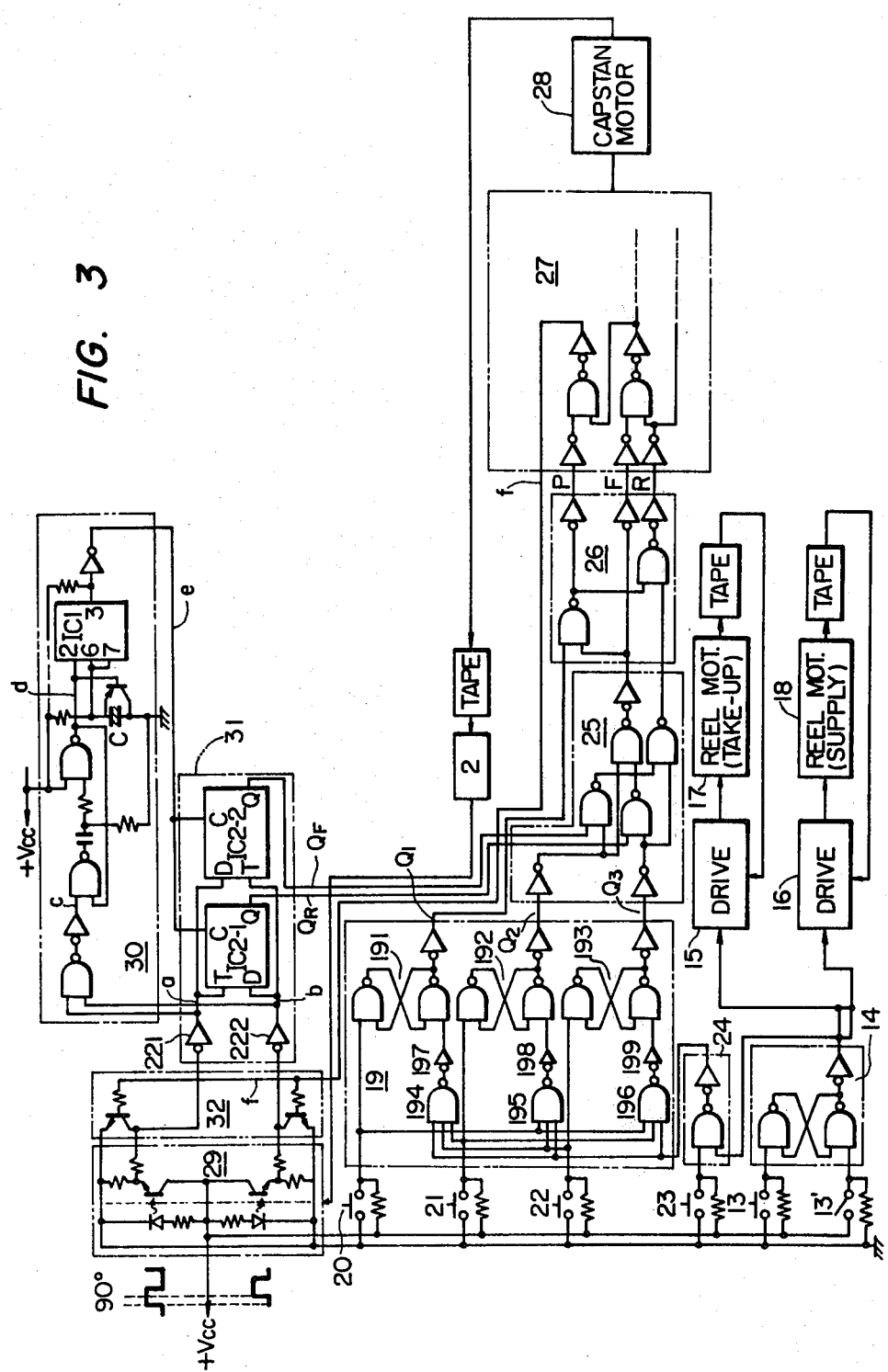
FIG. 3 is a specific circuit diagram showing the tape drive control system shown in FIG. 2.

Referring next to FIG. 3, each of the blocks shown in FIG. 2 will be described in greater detail.

The stand-by memory circuit 14 includes an R-S flip-flop and an inverter. The stand-by terminal 13 is coupled to the set terminal of the flip-flop and the tape loading terminal 13' to the set terminal. When a stand-by signal is applied to the terminal 13, the output of the stand-by memory circuit 14 is delivered to the driving circuits 15 and 16 to actuate them whereby the take-up and supply reel motors are rotated. If, in this condition, the tape is wound on the supply reel 9 and the take-up reel 8 through the roller 7, the idler 2, the capstan 1 and the roller 6, a desired predetermined tension is applied to the tape. The tension applied to the tape is maintained unchanged irrespective of the operational modes (record, playback, rewind and fast-forward modes) due to the fact that the tension of the tape is servo-controlled. The frictional force of the tape with respect to the capstan 1 is thus maintained constant. Details of this servo-control technique are disclosed in the applicants's co-pending application Ser. No. 50,289 filed June 20, 1979, now U.S. Pat. No. 4,309,728.

When a tape loading signal is applied to the terminal 13', the drive circuits 15 and 16 are deactuated. Accordingly, the rotations of the reel motors 17 and 18 are ceased. The tape loading signal is produced when the arms 4 and/or 5 are displaced from the positions where the arms 4 and 5 are maintained in balanced conditions with the tape tension and biasing forces of the springs 11 and 12. Such displacements of the arms occur in the case of tension loss caused by a broken tape or the termination of tape winding.

The output of the stand-by memory circuit 14 is further applied to the memory reset circuit 24. The memory reset circuit 24 includes a two-input AND gate and an inverter. The output of the stand-by memory 14 is applied to one input of the AND gate to the other input of which a stop signal applied to a stop terminal 23 of the memory reset circuit 24 is applied. The memory reset circuit 24 produces a memory reset signal when the stop signal is received at the terminal 23 and/or the reset signal is received at the terminal 13' of the stand-by memory circuit 14. Such a memory reset signal is applied to the next stage, the mode memory circuit 19, to thereby reset it.

The playback/record, fast-forward and rewind terminals 20, 21 and 22 of the mode memory circuit 19 are coupled to the respective set terminals of their associated flip-flops. To the reset terminal of one flip-flop, the memory reset signal delivered from the memory reset circuit 24 and the two mode signals of the non-associated terminals of the mode memory circuit 19 are applied through a three-input NAND gate and an inverter. More specifically, to the reset terminal of the flip-flop 191, provided in association with the playback/record terminal 20, the memory reset signal and the mode signals on the fast-forward and rewind terminals 21 and 22 are applied through the NAND gate 194 and the inverter 197. Similarly, to the reset terminals of the flip-flops 192 and 193, provided in association with the fast-forward and rewind terminals 21 and 22, the mode signals on the terminals 20 and 22 and those on the terminals 20 and 21 are applied together with the memory reset signal through the NAND gates 195 and 196 and the inverters 198 and 199, respectively.

With this circuit, if the operational mode is changed from the playback to the fast-forward mode, for example, the flip-flop 192 is set while the flip-flop 191 is reset. Either one of the mode signals applied to the terminals 20, 21 and 22 can be stored with the flip-flops provided in the mode memory circuit 19 until a mode change is effectuated or the memory reset signal is received from the memory reset circuit 24. The information stored in the mode memory circuit 19 appears at terminals $Q_1$, $Q_2$ and $Q_3$ which correspond to the playback/record mode, fast-forward mode, and rewind mode, respectively. Specifically, when the terminal $Q_1$ is HIGH and the terminals $Q_2$ and $Q_3$ are LOW, the information stored in the circuit 19 is indicative of the constant speed mode (playback/record). When the terminal $Q_2$ is HIGH and the terminals $Q_1$ and $Q_3$ are LOW, the information stored therein is indicative of the fast-forward mode. Similarly, when the terminal $Q_3$ is HIGH and the terminals $Q_1$ and $Q_2$ are LOW, the information stored therein is indicative of the rewind mode. When the memory reset signal is fed to the mode memory circuit 19 from the memory reset circuit 15, then the terminals $Q_1$, $Q_2$ and $Q_3$ are rendered LOW.

The terminal $Q_1$ of the memory mode circuit 19 is connected to the speed mode discrimination circuit 26 while the terminals $Q_2$ and $Q_3$ thereof are connected to the torque generation direction instructing circuit 25 to which the direction sensor circuit 31 (to be described later) is further connected so that a forward instruction signal $Q_F$ or a reverse instruction signal $Q_R$ is applied thereto. The output of the torque generation direction instructing circuit 25 is fed to the speed mode discrimination circuit 26 of the output of which is either a constant-speed-forward mode instruction, a fast-forward mode instruction, or a fast-reverse mode instruction. In the constant-speed-forward mode, only the signal on line P is HIGH and the signals on lines F and R are LOW. In the fast-forward mode, only the signal on line F is HIGH and the signals on lines P and R are LOW. Similarly, in the fast-reverse mode, only the signal on line R is HIGH and the signals on lines P and F are LOW. Such outputs of the speed mode discrimination circuit 26 are fed to the capstan motor drive circuit 27.

In response to the input signals on lines P, F and R, the capstan motor drive circuit 27 is actuated so as to properly drive the capstan motor 28. For example, when the capstan motor drive circuit 27 is in receipt of the constant-speed-forward mode instruction, it drives the capstan motor at the desired constant speed in the forward direction. When the capstan motor drive circuit 27 is driving the capstan motor 28 either in the constant-speed-forward mode, the fast-forward mode, or the fast-reverse mode, a LOW level signal is fed from the capstan motor drive circuit 27 to the detection instruction circuit 32 on a line f. When the capstan motor drive circuit 27 is in the stop mode, that is, when the signals on lines P, F and R are LOW, then a HIGH level signal is fed to the detection instruction circuit 32. The detection instruction circuit 32 includes a pair of NPN transistors and resistors respectively connected to the bases of the transistors with either the HIGH or LOW level signal applied to the bases of the transistors through the respective resistors. In response to the LOW level signal fed from the capstan motor drive circuit 27, the pair of transistors is rendered OFF, whereas in response to the HIGH level signal fed therefrom, the pair of transistors is rendered ON.

Figure 1:
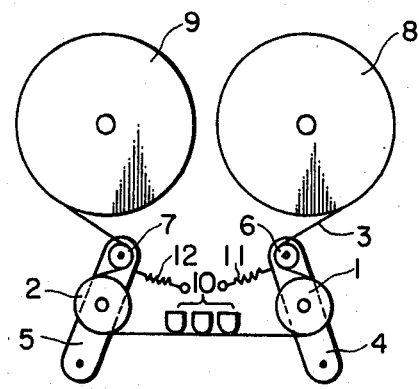
FIG. 1 is a schematic diagram showing a prior art pinch roller-less type tape recorder.
Figure 4:
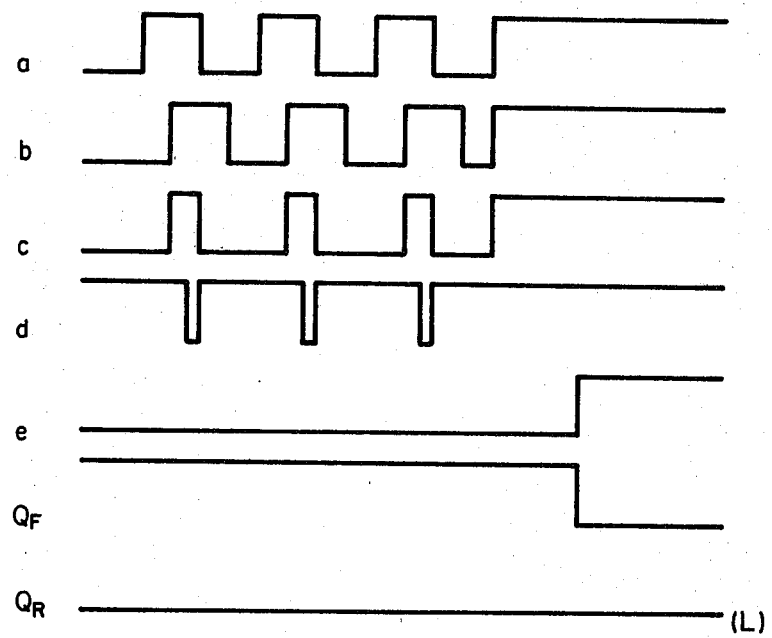
FIG. 4 is a timing chart illustrating the operation of a detection sensor and a stop sensor.

In accordance with the rotation of the idler 2 which is rotated in synchronization with the capstan motor 28 through the tape, the tape run sensor circuit 29 produces a pair of rectangular wave signals the phases of which are delayed by 90° from one to the other. The pair of rectangular wave signals is applied to the direction sensor circuit 31 where the direction of the tape run is sensed from the phase relation of the pair of rectangular wave signals. The direction sensor circuit 31 includes inverters 221 and 222, and D type flip-flops IC2-1 and IC2-2 for which an IC chip of dual-D type flip-flop type no. TC 4013P manufactured by Tokyo Shibaura Electric Co., Ltd. is usable. The first rectangular wave signal is applied to the trigger terminal T of the flip-flop IC2-1 and to the data terminal D of the flip-flop IC2-2 through the inverter 221. The second rectangular wave signal is applied to the data terminal D of the flip-flop IC2-1 and to the trigger terminal T of the flip-flop IC2-2 through the inverter 222. Assuming that the phase of the first rectangular wave signal on line a is delayed by 90° with respect to that of the second rectangular wave signal on line b as indicated in FIG. 4, the Q outputs of the flip-flops IC2-1 and IC2-2, that is, $Q_R$ and $Q_F$, are LOW and HIGH, respectively. Thus, the forward rotation instruction signal $Q_F$ is fed back to the torque generation direction instructing circuit 16.

The lines a and b are connected to the stop sensor circuit 30 where the stop of the tape is sensed. When the tape is stopped, the signals applied to the direction sensor circuit 31 are LOW because the transistors in the detection instruction circuit 32 are ON in this condition. Therefore, the signals on lines a and b are both HIGH. The stop sensor circuit 30 includes a timer IC1 for which an IC type no. M51841P produced by Mitsubishi Denki Co., Ltd. is usable, for example. In the stop condition of the tape, the trigger terminal "2" of the timer IC1 is set to be continuously HIGH so that a capacitor C is charged and a voltage more than a threshold level is applied to a threshold terminal "6" of the timer IC1. As a result, a HIGH level signal is produced from the stop sensor circuit 30 and is applied to the C terminals of the flip-flops IC2-1 and IC2-2 of the direction sensor circuit 31. Thus, the Q outputs of the flip-flops IC2-1 and IC2-2 are set to the LOW state.

Figure 5:
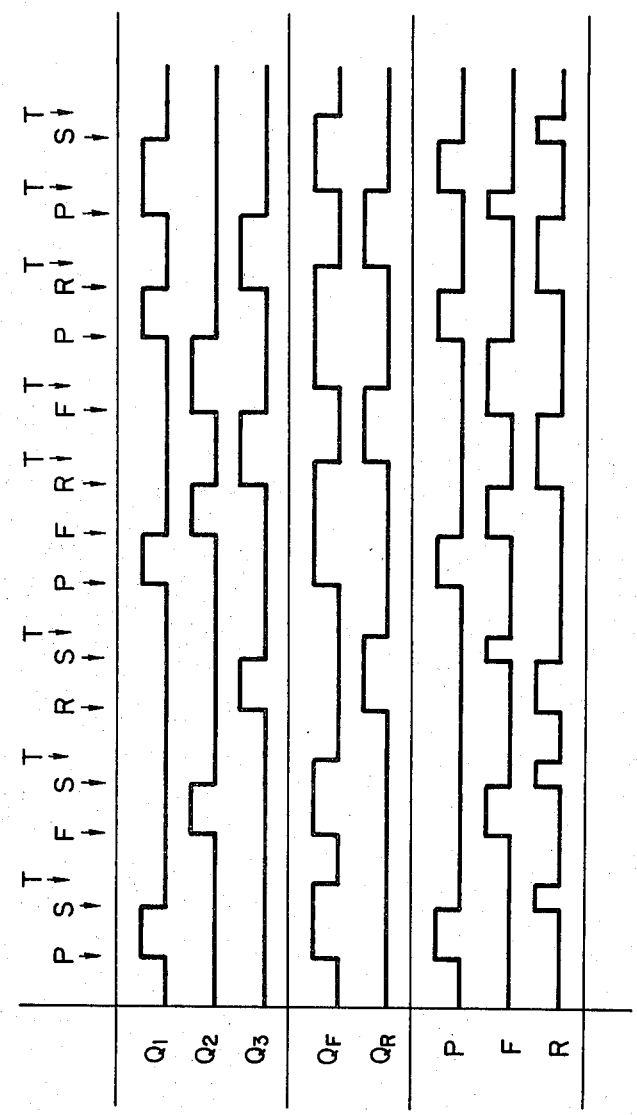
FIG. 5 is a timing chart illustrating the tape drive control operation according to the invention.

Referring to FIG. 5, the tape drive control operation in accordance with the system of the invention will be described in FIG. 5, reference characters P, S, F and R designate the constant-speed-forward mode, stop mode, fast-forward mode, and fast-reverse mode, respectively. Reference character T designates the output from the stop sensor circuit 30.

In order to go to the stop mode from the playback record mode, it is necessary to apply the stop signal to the terminal 23. When the stop signal is applied thereto, the memory reset signal is produced by the memory reset circuit 24 and applied to the mode memory circuit 19 to reset it. Accordingly, the terminal $Q_1$ becomes low. In this situation, the torque generation direction instructing circuit 25 is in receipt of the forward instruction signal ($Q_F$) from the direction sensor circuit 31. Therefore, the fast-reverse mode instruction (R) is applied to the capstan motor drive circuit 27. The fast-reverse mode instruction (R) is continuously applied thereto until the forward instruction signal ($Q_F$) from the direction sensor 31 is absent. Upon detection of the stop of the tape by the stop sensor 30, all of the circuit except the reel motor driving circuits 15 and 16 are reset and the stop of the tape run is accomplished.

The changing to the stop mode from the fast-forward and the rewind modes is implemented similar to the above operation. That is, when the fast-forward mode is shifted to the stop mode, the torque generation direction instructing circuit 25 delivers the fast-reverse mode instruction (R) to the capstan motor drive circuit 27. This instruction is continuously applied thereto until the forward instruction signal ($Q_F$) from the direction sensor circuit 31 is absent. On the other hand, when the rewind mode is changed to the stop mode upon receipt of the stop signal, the torque generation direction instructing circuit 25 applies the fast-forward mode instruction (F) to the capstan motor drive circuit 27. This instruction is continuously applied thereto until the reverse instruction signal ($Q_R$) is absent.

As described, in accordance with the invention, since the control of the tape run and tape stop is implemented by the control of the capstan motor, it is advantageous in that stabilized tape run is carried out. Further, since the invention does not employ a forcible brake device to stop the tape as was conventionally used, the tape will not be scratched or damaged. In further accordance with the invention, since direct change of the operational mode from one to the other can be carried out, the operational efficiency of the recorder is improved.

What is claimed is:

1. A tape drive control system for a pinch roller-less type tape recorder in which tension is applied to a tape and tape drive is implemented by a frictional force between a capstan and the tape, comprising:
    (a) a capstan and a capstan motor connected to rotate said capstan;
    (b) capstan motor drive means for driving said capstan motor;
    (c) mode instruction means for determining an operational mode of said capstan motor drive means, wherein when the operational mode determined by said mode instruction means is changed from a first mode to a stop mode, said mode instruction means instructs said capstan motor drive means so as to drive said capstan motor in an opposite direction with respect to the direction of said first mode for a duration such that an output of a direction detection means is indicative of the direction in said first mode; and
    (d) tape run detection means for detecting a tape run condition, said tape run detection means being connected to said mode instruction means, said mode instruction means operating in response to said output of said tape run detection means, and said tape run detection means comprising direction sensing means for sensing the direction of tape run and stop detection means for detecting a stop state of the tape.

2. The tape drive control system as claimed in claim 1 wherein said mode instruction means comprises a mode memory, torque generation direction instruction circuit means coupled to operate in response to outputs of said mode memory and said direction sensing means, speed mode discrimination circuit means for sensing a speed mode in accordance with outputs of said mode memory and said torque generation direction instruction circuit means, and means for resetting said mode memory.

3. The tape drive control system as claimed in claim 2 wherein said mode memory comprises first through third R-S flip-flops, a playback-record signal being coupled to a SET terminal of said first flip-flop, a fast forward signal being coupled to a SET terminal of said second flip-flop, and a rewind signal being coupled to a SET terminal of said third flip-flop, and first through third AND gate means having outputs coupled, respectively, to RESET terminals of said first through third flip-flops, a first terminal of said first AND gate means being coupled to said rewind signal and a second terminal of said first AND gate means being coupled to said fast forward signal, a first input terminal of said second AND gate means being coupled to said playback-record signal and a second input terminal of said second AND gate means being coupled to said rewind signal, a first input terminal of said third AND gate means being coupled to said playback-record signal and a second input terminal of said AND gate means being coupled to said fast forward signal, and a third input terminal of each of said AND gate means being coupled to an output of said memory reset circuit; wherein said memory resetting means comprises a fourth R-S flip-flop, a SET terminal of said fourth R-S flip-flop being coupled to a standby signal and a RESET terminal of said fourth R-S flip-flop being coupled to a tape load signal, and fourth AND gate means having a first input terminal coupled to a stop signal and a second input terminal coupled to an output of said fourth R-S flip-flop, an output of said fourth AND gate means being coupled to third input terminals of said first through third AND gate means.

4. The tape drive control system as claimed in claim 3 wherein said torque generation direction instruction circuit means comprises first and second inverters, said first inverter having an input coupled to an output of said second R-S flip-flop and said second inverter having an input coupled to an output of said third R-S flip-flop, first through fourth NAND gates, said first NAND gate having a first input terminal coupled to an output of said first inverter and a second input terminal coupled to a first output signal from said direction sensing means, said second NAND gate having a first input terminal coupled to an output of said second inverters and a second input terminal coupled to a second output signal from said direction sensing means, said third NAND gate having a first input terminal coupled to said output of said first inverter and a second input terminal coupled to an output of said second NAND gate, and said fourth NAND gate having a first input terminal coupled to an output of said first NAND gate and a second input terminal coupled to said output of said second inverter, and a third inverter having an input coupled to an output of said third NAND gate; and wherein said speed mode discrimination circuit means comprises a fifth NAND gate having a first input terminal coupled to an output of said first R-S flip-flop and a second input terminal coupled to an output of said inverter, a sixth NAND gate having a first input terminal coupled to an output of said fifth NAND gate and a second input terminal coupled to an output of said fourth NAND gate, fourth through sixth inverters, said fourth inverter having an input terminal coupled to said output of said fifth NAND gate, said fifth inverter having an input terminal coupled to said output of said third inverter, and said sixth inverter having an input terminal coupled to an output of said sixth NAND gate.

5. The tape drive control system of claim 1 further comprising detection instruction circuit means operating in response to an output of said capstan motor drive means, tape run sensing means for producing an output signal in response to an output of said detection instruction circuit means and in accordance with the position of an idler, an output of said tape run sensing means being coupled to inputs of said direction sensing means and said stop detection means.

6. The tape drive control system as claimed in claim 5 wherein said direction sensing means comprises first and second clocked flip-flops, said first clocked flip-flop being coupled to receive an output signal from said detection instruction circuit means opposite in phase to that received by said second clocked flip-flop and wherein said stop detection means comprises timer means operating in response to said output of said tape run sensing means, clock inputs of said clocked flip-flops being coupled to an output of said timer circuit means.

7. A tape control system for a pinch roller-less tape recorder in which a tension to a tape and tape drive is implemented by a frictional force between a capstan and the tape and an idler is in frictional contact with said tape, comprising:
(a) a capstan and a capstan motor connected to rotate said capstan;
(b) capstan motor drive means for driving said capstan motor;
a mode memory for storing playback/record, fast-forward, and fast-rewind instructions;
means for resetting said memory to provide an output from said memory corresponding to a stop mode in response to a stop signal;
direction sensing means operating in response to rotation of said idler for producing an output signal having states indicative of a forward movement state, a reverse movement state and a stopped state of said tape; and
torque generation direction instructing circuit means and speed mode discrimination circuit means for applying signals to said capstan motor drive means to cause said capstan motor drive means to operate said capstan motor with one of a (1) constant-speed-forward mode instruction, (2) a fast-forward mode instruction, and (3) a fast-rewind mode instruction in response to said output from said mode memory and an output from said direction sensing means.

8. The tape drive control system as claimed in claim 7, wherein said direction sensing means comprises tape run sensing means for producing a pair of rectangular wave signals in response to rotation of said idler, said rectangular wave signals having a phase relative to one another indicative of a running direction of said tape; and stop sensing means comprising delay circuit means for setting said output as said direction sensing means to indicate said stopped state a predetermined period of time after changes in said rectangular wave signals have ceased.

* * * * *